United States Patent
Hieda

(10) Patent No.: US 6,999,116 B1
(45) Date of Patent: Feb. 14, 2006

(54) IMAGE PROCESSING APPARATUS, METHOD AND COMPUTER-READABLE STORAGE MEDIUM HAVING A COLOR SUPPRESSION MECHANISM

(75) Inventor: Teruo Hieda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/501,017

(22) Filed: Feb. 9, 2000

(30) Foreign Application Priority Data

Feb. 19, 1999 (JP) ................... 11-041860

(51) Int. Cl.
 H04N 5/228 (2006.01)
 H04N 9/68 (2006.01)
 H04N 5/217 (2006.01)

(52) U.S. Cl. .................. 348/222.1; 348/234; 348/241; 382/162

(58) Field of Classification Search ............... 358/518, 358/520, 530; 382/162, 164, 274, 272, 275; 348/222.1, 223.1, 225.1, 234, 241, 256, 645, 348/646, 647, 235, 236, 237, 238, 162
See application file for complete search history.

(56) References Cited

U.S. PATENT DOCUMENTS

| | | | | |
|---|---|---|---|---|
| 4,668,979 A | * | 5/1987 | Jung ........................... | 358/515 |
| 4,754,323 A | * | 6/1988 | Kaji et al. ................... | 348/256 |
| 5,446,504 A | * | 8/1995 | Wada .......................... | 348/645 |
| 5,450,217 A | * | 9/1995 | Eschbach et al. ........... | 358/518 |
| 5,966,222 A | * | 10/1999 | Hirata et al. ................. | 358/520 |
| 6,438,264 B1 | * | 8/2002 | Gallagher et al. .......... | 382/167 |
| 6,515,700 B1 | * | 2/2003 | Nakamura et al. .......... | 348/256 |

FOREIGN PATENT DOCUMENTS

| | | |
|---|---|---|
| JP | 08-079783 | 3/1996 |
| JP | 11-027693 | 1/1999 |

* cited by examiner

Primary Examiner—Thai Tran
Assistant Examiner—Justin Misleh
(74) Attorney, Agent, or Firm—Morgan & Finnegan, L.L.P.

(57) ABSTRACT

An image processing apparatus for reducing image deterioration caused by a saturated area of an image signal obtained from an image sensor. Specifically, an image signal output from a CCD has a saturated portion that is detected by a saturation detector and has red, green and blue signals separated from it by a color separation unit. Prescribed processing is then applied to obtain color difference signals. A signal indicative of the saturated portion is stored in a FIFO memory and is subsequently read out. A control signal generator then generates a control signal with a prescribed waveform at the periphery of the saturated portion, and the control signal is also stored in a memory. The control signal is then read out of the memory and applied to a suppression signal generator, which outputs a suppression signal. Finally, a suppression circuit suppresses the color difference signals in conformity with the prescribed waveform.

12 Claims, 4 Drawing Sheets

SUPPRESSION CHARACTERISTIC OF COLOR SIGNAL IN AREA OF IMAGE DETERIORATION

SUPPRESSION CHARACTERISTIC OF COLOR SIGNAL
IN AREA OF IMAGE DETERIORATION

IMAGE DETERIORATION CAUSED
BY HIGH-LUMINANCE SUBJECT

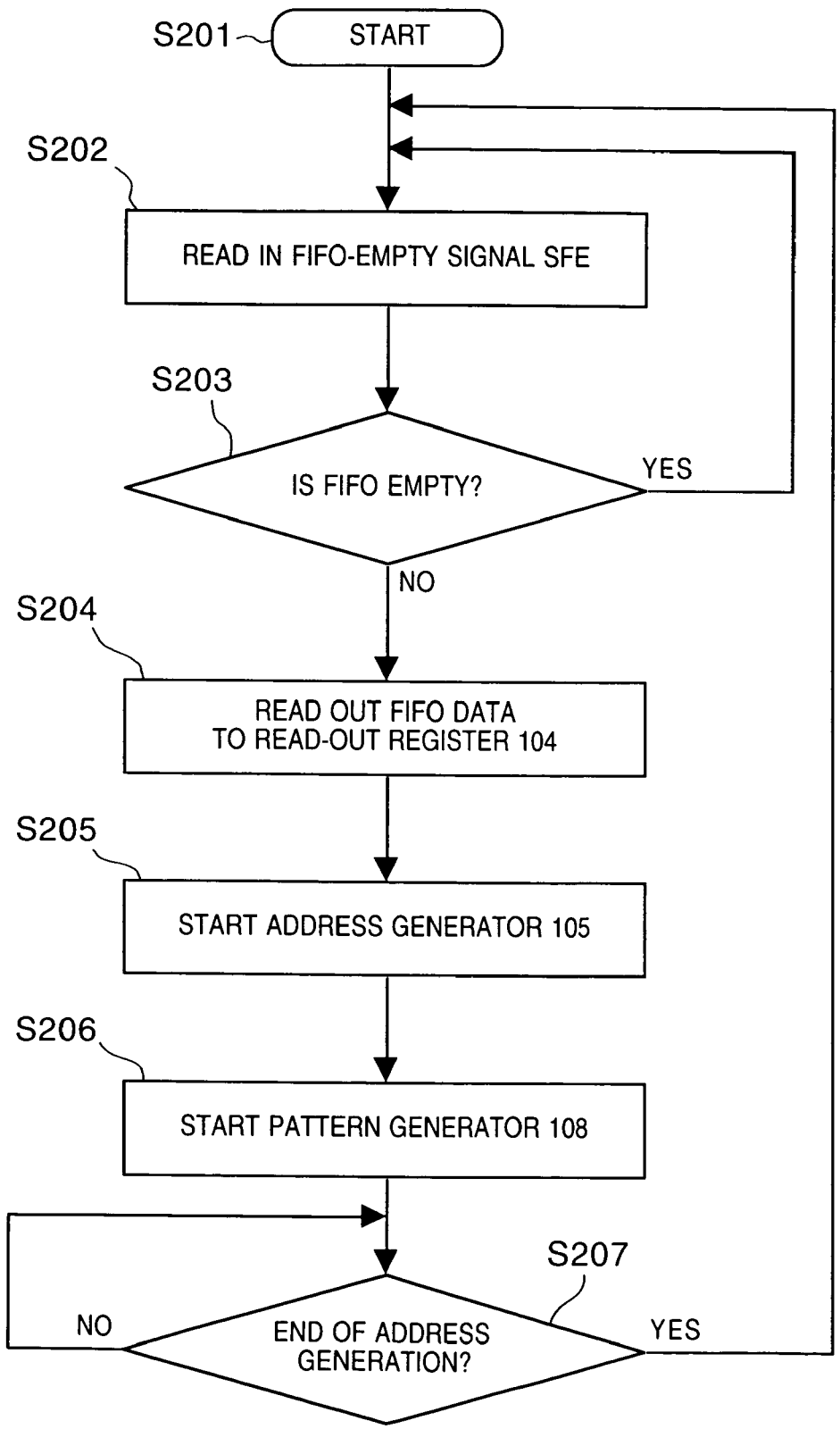

IMAGE PROCESSING APPARATUS, METHOD AND COMPUTER-READABLE STORAGE MEDIUM HAVING A COLOR SUPPRESSION MECHANISM

BACKGROUND OF THE INVENTION

This invention relates to an image processing apparatus and method for processing an image signal input from an image sensing device or the like, and to a computer-readable storage medium used in the apparatus and method.

Recent progress in digital signal processing technologies has led to major developments in the video field. In image sensing devices such as digital cameras, signal processing circuitry has been digitized to make possible devices exhibiting no signal deterioration or aging, unlike the case with devices composed of conventional analog circuits.

On the other hand, schemes in which signal processing is implemented not by hardware based upon digital circuits but by software using a CPU have also been proposed. Because the content of signal processing is decided by a program built into a ROM, such schemes make possible adaptive processing in which the content of processing is selected in accordance with the state of the input image.

With the above-described signal processing approach that relies upon digital circuitry, hardware corresponding to all selection candidates must be provided in order to execute adaptive processing. The problem that arises is a great increase in the scale of the circuitry.

With the approach that relies upon software for processing, on the other hand, processing speed is slower than with the hardware-implemented approach and ordinary moving-picture signals (e.g., 720×240 pixels; 60 fields per second) cannot be processed in real time.

The above-mentioned problems encountered with both approaches arise particularly when trying to reduce a decline in image quality due to saturation of the image sensor caused by a subject having a high degree of luminance.

SUMMARY OF THE INVENTION

Accordingly, an object of the present invention is to execute high-quality image processing by a simple circuit arrangement.

According to the present invention, the foregoing object is attained by providing an image processing apparatus comprising: detecting means for detecting, in an entered image signal, a high-luminance portion that exceeds a predetermined value; generating means for generating a control signal, which has a prescribed waveform at the periphery of the high-luminance portion of the image signal, in dependence upon the detection made by the detecting means; separating means for separating a color signal from the image signal; and suppression means for suppressing the separated color signal by the control signal.

Further, according to the present invention, the foregoing object is attained by providing an image processing method comprising: a detecting step of detecting, in an entered image signal, a high-luminance portion that exceeds a predetermined value; a generating step of generating a control signal, which has a prescribed waveform at the periphery of the sensed high-luminance portion of the image signal; a separating step of separating a color signal from the image signal; and a suppression step of suppressing the separated color signal by the control signal.

Further, according to the present invention, the foregoing object is attained by providing a computer-readable storage medium storing a program for executing: detection processing for detecting, in an entered image signal, a high-luminance portion that exceeds a predetermined value; generation processing for generating a control signal, which has a prescribed waveform at the periphery of the sensed high-luminance portion of the image signal; separation processing for separating a color signal from the image signal; and suppression processing for suppressing the separated color signal by the control signal.

Other objects and advantages besides those discussed above shall be apparent to those skilled in the art from the specification of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a flowchart illustrating processing executed by a pattern controller in FIG. 1.

DESCRIPTION OF THE PREFERRED EMBODIMENT

A preferred embodiment of the present invention will now be described with reference to the drawings.

Figure 1:
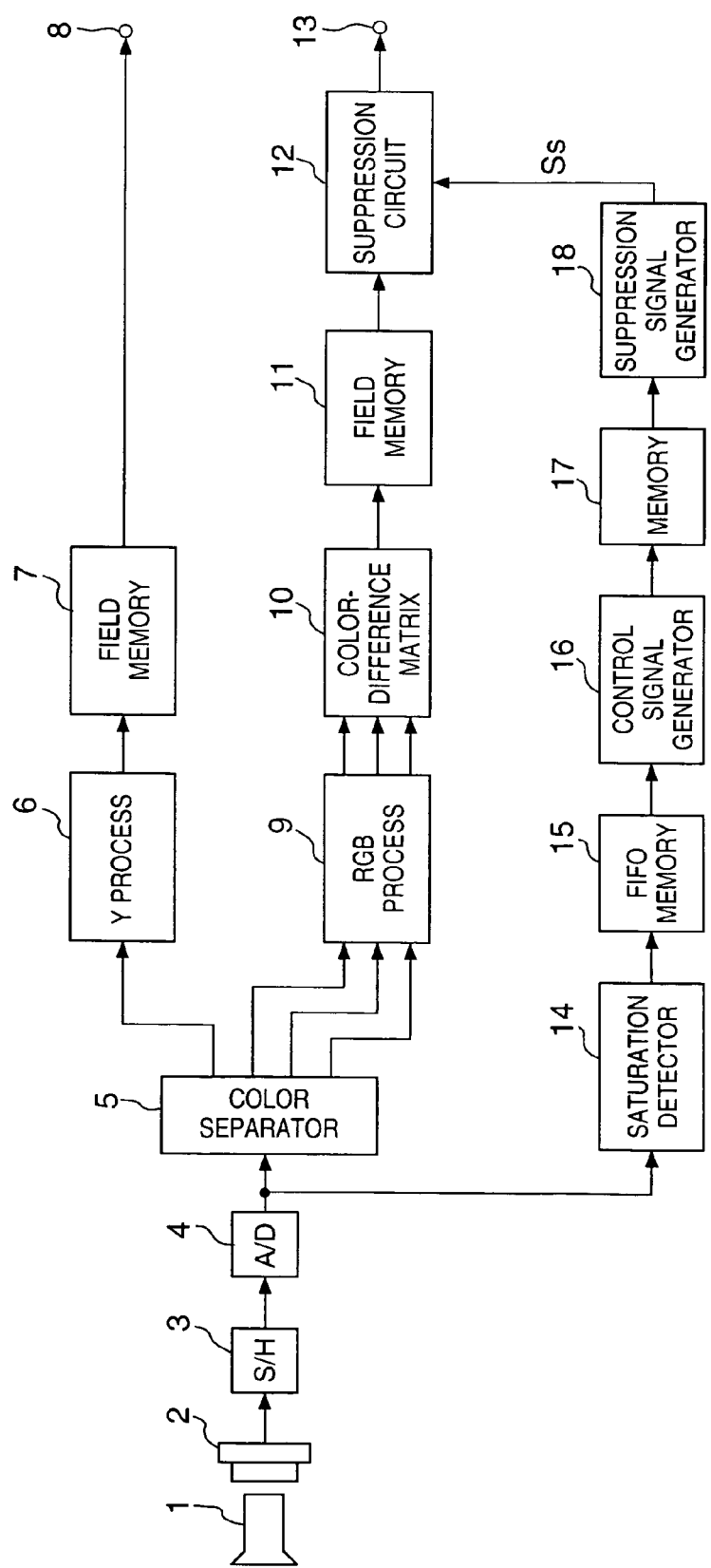
FIG. 1 is a block diagram illustrating an image sensing device which includes an image processor in accordance with an embodiment of the present invention.

FIG. 1 is a block diagram illustrating an image sensing device which includes an image processor according to this embodiment of the present invention.

As shown in FIG. 1, the image sensing device includes a taking lens 1; a CCD 2, which is a color image sensor; a sample-and-hold unit 3 for rendering the output signal of the CCD 2 continuous; an A/D converter 4; a color separator 5 for separating a luminance signal Y and color signals R, G, B from a digital image signal obtained by the A/D converter 4; a Y process unit 6 for subjecting the luminance signal Y to processing such as a gamma correction, black-level clipping, white-level clipping and contour emphasis; a field memory 7 for delaying the input luminance signal by one field; and an output terminal 8 for the luminance signal Y.

The image sensing device further includes an RGB process unit 9 for subjecting the color signals R, G, B to processing such as white balance control, a gamma correction, black-level clipping and white-level clipping; a color-difference matrix unit 10 for subjecting the R, G, B signals to matrix processing, thereby to generate color difference signals, and for multiplexing the color difference signals; a field memory 11 for delaying the multiplexed color difference signal by one field; a suppression unit 12 for suppressing the multiplexed color difference signal in conformity with a suppression signal Ss, described later; and an output terminal 13 for a multiplexed color difference signal C.

The image sensing device further includes a saturation detector 14 for detecting saturation of the digital image signal; a first-in first-out (FIFO) memory 15; a control signal generator 16 for generating a control signal; a memory 17 for storing the control signal; and a suppression-signal generator 18 for reading the control signal out of the memory 17, generating the suppression signal Ss and outputting the same.

The operation of this arrangement will now be described.

The image of a subject (not shown) is formed on the photoelectric converting surface of the CCD 2 by the taking lens 1. This image is composed of electric charge obtained by photoelectric conversion. The electric charge within the CCD 2 is transferred successively by driving pulses generated by a driving-pulse generating circuit (not shown), is converted to voltage at the output of the CCD 2 and is output as a captured-image signal. The captured-image signal is sampled continuously by the sample-and-hold unit 3 and is converted to a digital image signal by the A/D converter 4.

The digital image signal is converted to the luminance signal Y and color signals R, G, B by the color separator 5. The luminance signal Y is subjected to processing such as a gamma correction, black-level clipping, white-level clipping and contour emphasis in the Y process unit 6 and then is delayed by one field by the field memory 7. The resulting signal is output to equipment such as a television monitor or VTR, along with a C signal, described later, from the Y output terminal 8.

The color signals R, G, B in the output of the color separator 5 are subjected to processing such as white balance control, a gamma correction, black-level clipping and white-level clipping in the RGB process unit 9 and then are converted to color difference signals R-Y and B-Y in the color-difference matrix unit 10, after which the signals are multiplexed by dot-sequencing to provide a multiplexed color difference signal. The multiplexed color difference signal is delayed by one field in the field memory 11 and is suppressed in conformity with the suppression signal Ss in the suppression unit 12. The resulting signal is output from the C output terminal 13.

The digital image signal output of the A/D converter 4 has its saturation detected by the saturation detector 14 through a method such as one that detects a portion of the signal that exceeds a predetermined threshold value. A signal indicative of the detected saturation is stored temporarily in the FIFO memory 15. The signal indicative of saturation stored in the FIFO memory 15 is converted by the control signal generator 16 to a control signal for suppressing the color signals. The control signal is then written to the memory 17. The control signal that has been written to the memory 17 is read out by the suppression-signal generator 18 and is output as the suppression signal Ss, namely the control signal of the suppression unit 12. This control signal suppresses the above-mentioned color signals.

Figure 2B:
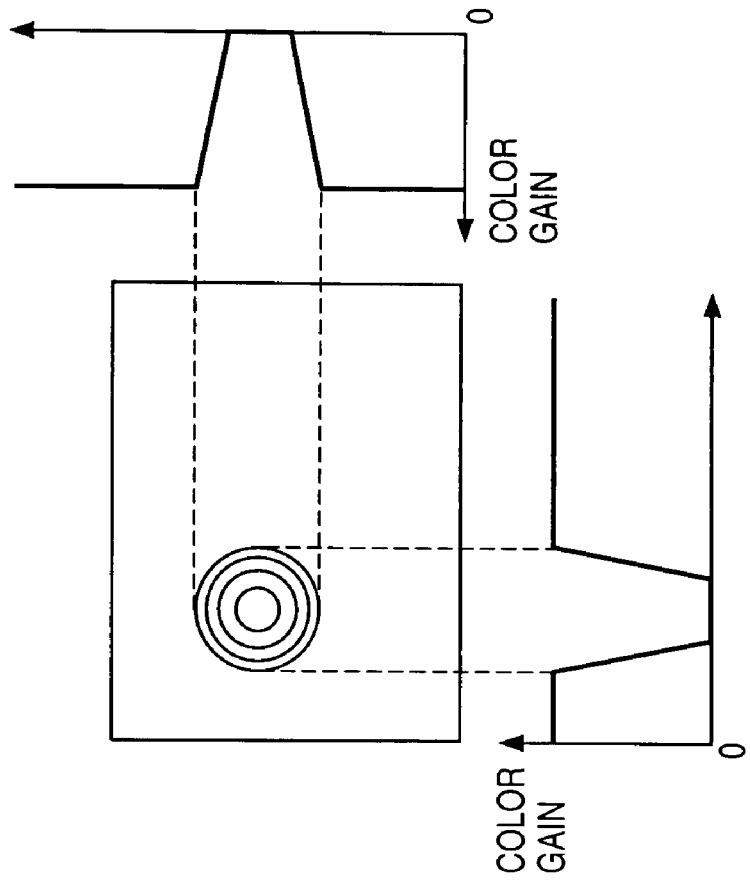
FIGS. 2A and 2B are diagrams showing an arrangement that is useful in describing the principles of the present invention.
Figure 2A:
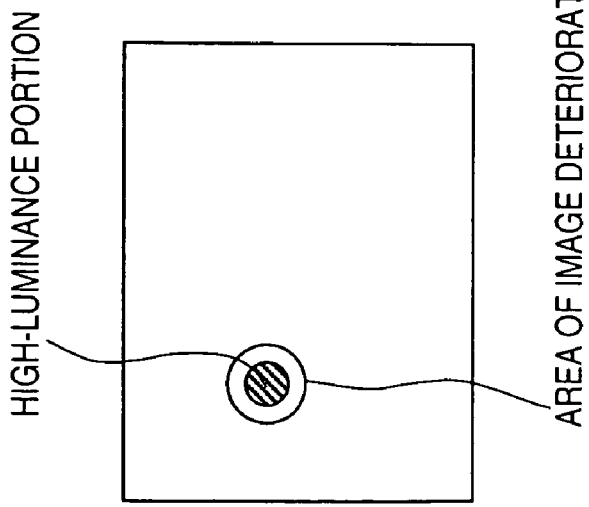

FIGS. 2A and 2B are diagrams useful in describing the principles of the embodiment.

FIG. 2A illustrates a decline in image quality caused by a high-luminance subject. By way of the example, the portion illustrated as the high-luminance portion is a subject which causes sunlight to impinge upon the taking lens 1 by reflection at a mirror surface. Because the high-luminance portion generates electric charge in the CCD 2 that exceeds the saturation level, the color carrier signal in the output signal vanishes and this causes an image deterioration phenomenon referred to as high-luminance false color. This makes it necessary to suppress the color signals.

Phenomena that occur at the portion indicated in the area of image deterioration surrounding the high-luminance portion include aberration of the taking lens 1, particularly aberration referred to as axial chromatic aberration, in which focal length changes owing to the wavelength of the light; optical deterioration such as flare and ghosts; and so-called blooming, in which electric charge produced on the CCD 2 overflows at the periphery. As a consequence, unnecessary coloration occurs and results in a decline in image quality.

FIG. 2B illustrates a color-signal suppression characteristic with regard to the area of image deterioration. As mentioned above, unnecessary coloration is produced in the high-luminance portion and at the periphery of the high-luminance portion and, as a consequence, it is necessary to suppress the color signals. The characteristic of this phenomenon is as follows:

(1) The unnecessary colors are centered on the high-luminance portion and decrease as distance from the center of the high-luminance portion increases.

(2) If there is a discontinuous characteristic between the portion subjected to suppression and the periphery thereof, a dummy contour will be produced and image quality will undergo a marked decline.

For these reasons, it is necessary to adopt a suppression characteristic in which color gain is made zero in the high-luminance portion and suppression is reduced as the periphery is approached and is eliminated at a location beyond a predetermined distance from the high-luminance portion. FIG. 2B illustrates this characteristic.

Figure 3:
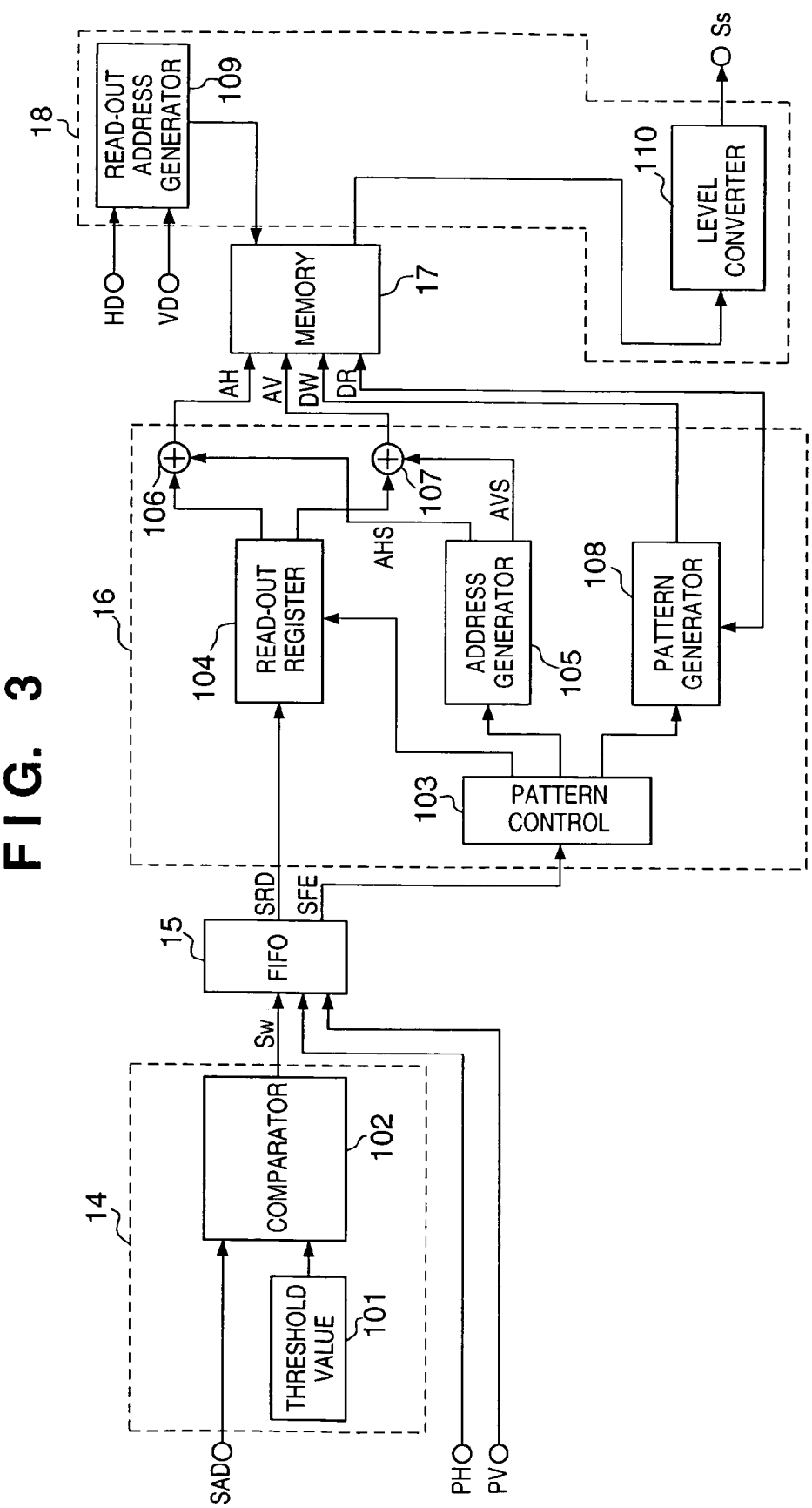
FIG. 3 is a block diagram showing the principal components in FIG. 1.

FIG. 3 is a block diagram illustrating the details of construction of the components 14 to 18, which are the principal components in FIG. 1.

As shown in FIG. 3, the saturation detector 14 includes a register 101 for storing a predetermined threshold value and a comparator 102. The control signal generator 16 includes a pattern controller 103; a readout register 104 for storing data that has been read out of the FIFO 15; an address generator 105 for generating a write address of the memory 17; adders 106 and 107; and a pattern generator 108 for generating a predetermined pattern. The suppression-signal generator 18 includes a read-out address generator 109 for generating a read-out address of the memory 17, and a level converter 110.

The operation of the components described above will now be described.

A digital image signal SAD, which is the output of the A/D converter 4, is compared in the comparator 102 with a predetermined threshold value from the register 101. The output Sw of the comparator 102, which output corresponds to the saturated portion of the digital image signal, is stored in the FIFO memory 15 as a horizontal scanning position PH and vertical scanning position PV generated by a timing generator, which is not shown.

When a scanning position corresponding to the saturated portion is stored in the FIFO memory 15, as mentioned above, a FIFO-empty signal SFE, which represents whether information has been stored in the FIFO memory 15, is read out by the pattern controller 103. When the signal SFE indicates that the FIFO is empty, no operation is performed.

When the signal SFE indicates that the FIFO is not empty, the pattern controller 103 first controls the readout register 104 to read out data SRD, which represents the scanning position that corresponds to the saturated portion and that is stored in the FIFO memory 15, and to load this data in the readout register 104.

Next, the pattern controller 103 controls the address generator 105 so that the latter generates a series of horizontal and vertical addresses AHS, AVS in a predetermined order. The generated horizontal and vertical addresses AHS, AVS are added by the adders 106, 107, respectively, to the horizontal and vertical positions, respectively, stored in the readout register 104, whereby a conversion is made to addresses the center of which is the saturated portion. The conversion outputs are input to the memory 17 as horizontal and vertical addresses AH, AV, respectively.

The pattern controller 103 further controls the pattern generator 108 so that the latter generates a prescribed two-dimensional waveform that corresponds to the addresses AHS, AVS generated by the address generator 105. At this time a value DR at the horizontal and vertical addresses of the memory 17 is read out, this value is compared with the value of the waveform generated in the manner described above and, by way of example, a larger value is written to the memory 17 as write data DW at a location designated by the horizontal and vertical addresses AHS, AVS.

Thus, the operation described above is such that if there are a plurality of saturated areas, a suppression signal that gives priority to the largest degree of suppression can be generated.

When the generation of the series of addresses and of the two-dimensional waveform is completed, the pattern controller 103 reads out the FIFO-empty signal SFE again and repeats the above-described operation until the FIFO is emptied.

The two-dimensional waveform thus written to the memory 17 is then read out. Specifically, the read-out address of the memory 17 is generated by the read-out address generator 109 in dependence upon synchronizing signals HD and VD generated by a synchronizing signal generator (not shown), and the two-dimensional waveform is read out based upon this read-out address in accordance with television scanning. The data that has been read out is converted by the level converter 110 to a level suited to the suppression signal, the resulting signal is applied to the suppression unit 12 as the suppression signal Ss, and the color signals in the saturated portion of the CCD and in the peripheral portion thereof are suppressed in the manner described above.

FIG. 4 is a flowchart illustrating processing in a case where the pattern controller 103 is implemented by a microcomputer.

After processing starts at step S201 in FIG. 4, the FIFO-empty signal SFE that indicates whether information has been stored in the FIFO memory 15 is written in at step S202. This is followed by step S203, at which it is determined whether the FIFO-empty signal SFE indicates that the FIFO is empty. Control returns to S202 if the FIFO is empty.

If the FIFO is not empty, then control proceeds to S204, at which the data SRD representing the scanning position stored in the FIFO memory 15 is read out to the readout register 104. Next, at S205, the address generator 105 is controlled so as to generate the series of horizontal and vertical addresses of the predetermined order. Then, at S206, the pattern generator 108 is controlled so as to generate the predetermined two-dimensional waveform that corresponds to the addresses generated by the address generator 105. This is followed by S207, at which it is determined whether the address generator 105 has finished address generation. Control returns to S207 if the answer is "NO" and to S202 if the answer is "YES", after which the above-described control is repeated.

A storage medium in accordance with the present invention will now be described.

Though the embodiment illustrated in FIGS. 1 and 3 is implemented by hardware, it can also be implemented by a computer system having a CPU and memory. In case of implementation by a computer system, the memory constitutes a storage medium in accordance with the present invention. A program for executing the processing according to the flowchart of FIG. 4 and the operation described in this embodiment is stored in this storage medium.

This storage medium may be a semiconductor memory such as a ROM or RAM, an optical disk, a magneto-optic disk or a magnetic storage medium, etc., and these may be constructed in the form of a CD-ROM, floppy disk, magnetic card, magnetic tape or non-volatile memory card, etc.

Accordingly, functions equivalent to those of the foregoing embodiment can be implemented, similar effects can be obtained and the object of the present invention can be attained by using the storage medium in a system or apparatus other than that according to FIGS. 1 and 4, and reading out and executing program code, which has been stored on the storage medium, by this system or by a computer.

Further, functions equivalent to those of the foregoing embodiment can be implemented, similar effects can be obtained and the object of the invention can be attained in a case where an operating system or the like running on a computer performs all or a part of the processing or in a case where, after the program codes read from the storage medium are written in a function expansion board inserted into the computer or in a memory provided in a function expansion unit connected to the computer, a CPU or the like contained in the function expansion board or function expansion unit performs all or a part of the entire process in accordance with the designation of program codes.

In accordance with the present invention, as described above, it is possible to reduce a decline in the image quality of a high-luminance portion of an image signal.

Further, since information regarding a saturated area is stored in memory in order to obtain the above-described effects, means for generating a control signal can be realized by a circuit having a small processing capability because it is no longer always necessary to execute processing in real time. This makes it possible to obtain the best characteristic at low cost.

Further, it is possible to reduce image deterioration of an area caused by light having an intensity greater than the saturation level of the image sensor on which the light impinges.

In addition, color-signal suppression can be carried out continuously and smoothly, thereby making it possible to eliminate unnecessary coloration of an image signal as well as dummy contours.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
   a detecting part which detects, in an inputted image signal, a high-luminance portion that exceeds a predetermined value;
   a pattern generating part which generates a two dimensional pattern according to the detection made by said detecting part, the pattern spreading two-dimensionally from a center of the detected high-luminance portion to a periphery of the detected high-luminance portion in both a horizontal direction and a vertical direction and having suppression characteristics such that a suppression level is reduced from the center of the detected high-luminance portion toward the periphery of the high-luminance portion;

a separating part which separates a color signal from the image signal; and a suppression part which suppresses the separated color signal in a prescribed two-dimensional area including the detected high-luminance portion in both the horizontal direction and the vertical direction by the two dimensional pattern.

2. The apparatus according to claim 1, further comprising:

a first storage part which stores an output from said detecting part, wherein said generating part generates the two dimensional pattern according to an output from said first storage part; and a second storage part which stores said pattern, wherein said suppression part suppresses the color signal using the pattern read out of said second storage part.

3. The apparatus according to claim 1, wherein the image signal is a signal of an image captured by an image sensing part, and said detecting part detects a saturated portion of said image sensing part as the high-luminance portion.

4. The apparatus according to claim 1, wherein the two dimensional pattern has the suppression characteristic in which gain of the color signal is made zero in the high-luminance portion and suppression is reduced with distance from the high-luminance portion toward the periphery thereof and is eliminated at a location beyond a predetermined distance from the high-luminance portion.

5. An image processing method comprising:

detecting, in an inputted image signal, a high-luminance portion that exceeds a predetermined value;

generating a two dimensional pattern according to the detection made in said detecting processing, the pattern spreading two-dimensionally from a center of the detected high-luminance portion to a periphery of the detected high-luminance portion in both a horizontal direction and a vertical direction and having suppression characteristics such that a suppression level is reduced from the center of the detected high-luminance portion toward the periphery of the high-luminance portion;

separating a color signal from the image signal; and suppressing the separated color signal in a prescribed two-dimensional area including the detected high-luminance portion in both the horizontal direction and the vertical direction by the two dimensional pattern.

6. The method according to claim 5, further comprising:

first storing the detected high-luminance portion, wherein said generating step generates the two dimensional pattern in dependence upon this stored high-luminance portion; and second storing said two dimensional pattern, wherein said suppression step suppresses the color signal upon reading out the stored two dimensional pattern.

7. The method according to claim 5, wherein the image signal is a signal of an image captured by an image sensing part, and said detecting step detects a saturated portion of said image sensing part as the high-luminance portion.

8. The method according to claim 5, wherein the two dimensional pattern has the suppression characteristic in which gain of the color signal is made zero in the high-luminance portion and suppression is reduced with distance from the high-luminance portion toward the periphery thereof and is eliminated at a location beyond a predetermined distance from the high-luminance portion.

9. A computer-readable storage medium storing a program for executing:

detection processing for detecting, in an inputted image signal, a high-luminance portion that exceeds a predetermined value;

generation processing for generating a two dimensional pattern according to the detection in said detection processing, the pattern spreading two-dimensionally from a center of the detected high-luminance portion to a periphery of the detected high-luminance portion in both a horizontal direction and a vertical direction and having suppression characteristics such that a suppression level is reduced from the center of the detected high-luminance portion toward the periphery of the high-luminance portion;

separation processing for separating a color signal from the image signal; and suppression processing for suppressing the separated color signal in a prescribed two-dimensional area including the detected high-luminance portion in both the horizontal direction and the vertical direction by the two dimensional pattern.

10. The storage medium according to claim 9, said storage medium further storing:

a program for executing processing for storing the detected high-luminance portion, wherein said generating processing generates the two dimensional pattern according to the detection made in said detecting processing; and a program for executing processing for storing said two dimensional pattern, wherein said suppression processing suppresses the color signal upon reading out the stored two dimensional pattern.

11. The storage medium according to claim 9, wherein the image signal is a signal of an image captured by an image sensing part, and said detecting processing detects a saturated portion of said image sensing part as the high-luminance portion.

12. The storage medium according to claim 9, wherein the two dimensional pattern has the suppression characteristic in which gain of the color signal is made zero in the high-luminance portion and suppression is reduced with distance from the high-luminance portion toward the periphery thereof and is eliminated at a location beyond a predetermined distance from the high-luminance portion.

* * * * *